US 7,506,270 B1

(12) United States Patent
Bailey et al.

(10) Patent No.: US 7,506,270 B1
(45) Date of Patent: Mar. 17, 2009

(54) METHODS AND ARRANGEMENTS FOR SELECTIVE PLACEMENT OF MOVABLE OBJECTS WITHIN A GRAPHICAL USER INTERFACE

(75) Inventors: Richard St. Clair Bailey, Bellevue, WA (US); Stephen R. Falcon, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 09/638,658

(22) Filed: Aug. 14, 2000

(51) Int. Cl.
*G06F 3/048* (2006.01)
(52) U.S. Cl. .................. 715/787; 715/784; 715/785
(58) Field of Classification Search .............. 345/581, 345/612–614, 784, 785, 786, 787, 858, 862; 715/784–787, 858, 862
See application file for complete search history.

(56) References Cited

U.S. PATENT DOCUMENTS

| | | | | |
|---|---|---|---|---|
| 5,506,951 A | * | 4/1996 | Ishikawa | 345/786 |
| 5,808,601 A | * | 9/1998 | Leah et al. | 345/856 |
| 5,870,083 A | * | 2/1999 | Shieh | 345/173 |
| 6,204,846 B1 | * | 3/2001 | Little et al. | 345/784 |
| 6,331,866 B1 | * | 12/2001 | Eisenberg | 345/784 |
| 6,339,438 B1 | * | 1/2002 | Bates et al. | 345/787 |
| 6,894,678 B2 | * | 5/2005 | Rosenberg et al. | 345/157 |

* cited by examiner

*Primary Examiner*—Simon Ke
(74) *Attorney, Agent, or Firm*—Lee & Hayes, PLLC

(57) ABSTRACT

Methods and arrangements are provided that allow for a gradual visual correction between a user's input and a selected object within a graphical user interface (GUI) environment. For example, if an offset exists between a user's input and an object's preferred contact area, then, as the user manipulates the object (e.g., moves the object within the GUI environment) the magnitude of the offset is selectively and incrementally altered in a manner that is nearly imperceptible to the user. This corrective process is continued, until the user's input and the object's preferred contact area falls within a defined tolerance. Consequently, the correction process tends to be more pleasing and in some instances more realistic than an immediate correction or maintenance of a continued offset.

27 Claims, 4 Drawing Sheets

METHODS AND ARRANGEMENTS FOR SELECTIVE PLACEMENT OF MOVABLE OBJECTS WITHIN A GRAPHICAL USER INTERFACE

TECHNICAL FIELD

This invention relates to graphical user interfaces (GUIs), and more particularly to methods and arrangements for selectively placing movable objects within the GUI based on user inputs.

BACKGROUND

Graphical user interfaces (GUIs) are popular in a variety of computing applications and/or operating systems. A typical GUI provides visual feedback to the user of his or her actions (e.g., inputs, and responses thereto). There is a move underway to make more devices or other types of appliances seemingly "smarter" or more user friendly by introducing similar graphical interfaces and like capabilities. Thus, for example, a kiosk, automatic teller machines, microwave ovens, video cassette recorders (VCRs), cellular telephones, and the like are beginning to provide GUIs that are programmed to enrich the user's interactions with the device. This may include, for example, adding selectable icons, scrollable lists, and hierarchical pages.

More interestingly for this Background section, in certain instances, physical user interfaces, such as, e.g., knobs, buttons, switches, handles, and the like, can be graphically modeled and included within the graphical user interface as selectable/movable objects. Hence, a user can graphically open a closed drawer, turn up/down a volume control, or perhaps select a feature, product or service.

Causing such an action to occur typically requires the user to provide the requisite user inputs to the controlling GUI logic. This may include physically moving and/or activating an input device, such as, e.g., a mouse, a trackball or the like, which provides corresponding user input signals to the controlling GUI logic, directly or indirectly.

Another type of physical input device is a touch pad or touch screen. Touch screen are usually configured to allow the user to touch an exposed surface of a cathode ray tube (CRT), liquid crystal display (LCD), plasma display, or the like, through which the GUI environment and GUI objects are visible. Here, the user may touch the exposed surface with his or her finger or some other object, such as, e.g., a stylus. The touch screen includes a detection mechanism (e.g., an electrically detectable grid array) is configured to detect the point of contact on the exposed surface and to provide this positional information to the controlling GUI logic. Provided with this positional information, the GUI logic can determine which portion of the GUI interface and/or GUI object, the user is attempting to select, move, alter, or otherwise influence.

Touch screens are particularly useful and popular in appliances that have limited user input devices and/or display capabilities. For example, touch screens are popular in personal digital assistant (PDA) devices, cellular telephones, kiosks, etc. Unfortunately, when a GUI object is selected in a conventional touch screen GUI environment, the position of the pointing device, e.g., stylus, fingertip, etc. may not always be at or near the center or other preferred "grab point" of the selected object. For example, a user may select a slider portion of a modeled sliding control knob at a corner or along an edge. In the physical world, as opposed to the virtual world of the GUI, one would not typically miss a slider or other knob in this manner when attempting to move/activate it. Granted, sliders and certain other types of switches can be pushed from an edge, but this would only allow for movement in a particular direction.

Nevertheless, many conventional GUI environments model this unnatural capability, while others try to automatically correct the situation. Thus, for example, in some cases, an offset between the user input position and the GUI object is determined and then maintained throughout the movement/activation process. In other cases, the GUI object (e.g., the slider knob) is immediately relocated within the GUI environment in such a manner that it is "correctly" positioned in accord with the user's input.

While each of these implementations tends to work just fine, many users may find the maintained offset or the immediate correction less pleasing. Thus, there is a need for improved methods and arrangements that can provide for a more pleasing and in some cases a more realistic user interface capability.

SUMMARY

Improved methods and arrangements are provided for selectively placing movable objects within a graphical user interface (GUI) or the like, based on user inputs. In accordance with certain aspects of the present invention, the methods and arrangements tend to provide for a visually more pleasing and in some cases a more realistic user interface capability.

Thus, for example, in accordance with certain aspects, methods and arrangements are provided that allow for a gradual visual correction between a user's input and a selected object. If an offset exists between a user's input and an object's preferred contact area or point, then, as the user manipulates the object (e.g., moves the object within the GUI) the magnitude of the offset is selectively and incrementally altered over time/distance in a manner that is nearly imperceptible to the user. This corrective process is continued, until the user's input and the object's preferred contact area or point falls within some definable tolerance. Consequently, the correction process tends to be more pleasing and in some instances more realistic than an immediate correction or maintenance of a continued offset.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
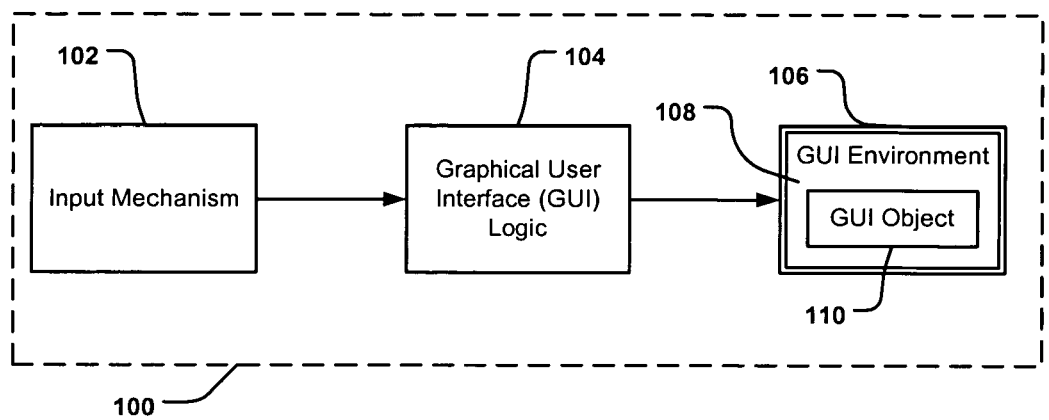
FIG. 1 is block diagram depicting an exemplary device having a user input mechanism, a display device and graphical user interface (GUI) logic, suitable for use with certain implementations of the present invention.

In FIG. 1 a device 100 is depicted as having at least one user input mechanism 102, graphical user interface (GUI) logic 104 and a display device 106.

Device 100 can be any device, including, for example, a stand alone device, a peripheral device, an appliance, a handheld device, an entertainment device, a communication device, a portable device, etc., that is designed to present the user with a GUI environment having selectable GUI objects, features or functions.

With this in mind, in accordance with certain demonstrative implementations of the present invention, device 100 can be included within a computer, for example, as described below and shown in FIG. 2, and within an auto PC environment of a vehicle.

Input mechanism 102 preferably includes a conventional touch pad or touch screen and associated circuitry and/or logic. Input mechanism 102 is configured to detect a touch location of a touching mechanism. Here, for example, the touching mechanism can be a fingertip, a pin, a stylus, or other appropriate object. The location or positional information that is derived from the physical contact is typically based on a coordinate system associated with the touchable area on the surface of the touch screen. The positional information may be directly associated with, or otherwise convertible to match, a coordinate system used by GUI logic 104. The resulting positional information is provided by input mechanism 102 to GUI logic 104.

GUI logic 104 can include hardware, firmware, software, or any mixture thereof. GUI logic 104 is configured to receive user inputs, for example, the positioning information from input mechanism 102, and output signals that cause display device 106 to visually display a GUI environment 108 having at least one GUI object 110 selectable therein. GUI logic 104 may therefore include many of the hardware and software portions as described below with respect to the computer shown in FIG. 2.

Though depicted as functionally separate in FIG. 1, display device 106 is preferably operatively and physically associated with input mechanism 102. Thus, for example, in the case of a touch screen based input mechanism, display device 106 would be provided below a non-opaque portion of the touch screen so as to allow GUI environment 108 and GUI object 110 to be seen there through.

Figure 2:
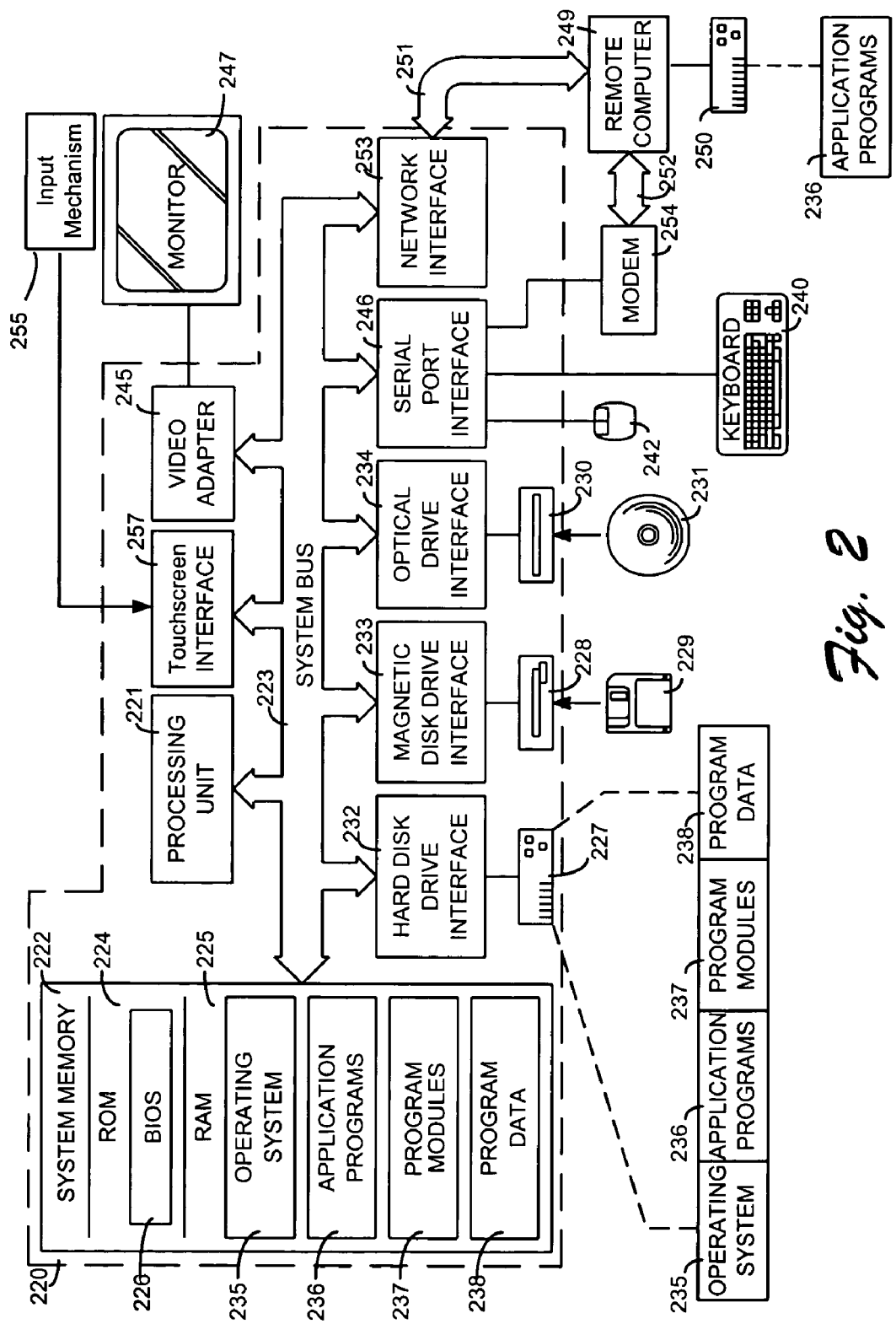
FIG. 2 is a block diagram depicting an exemplary computer environment that is suitable for use with certain implementations of the present invention.

Reference is now made to FIG. 2, which is a block diagram of an exemplary computing system 200.

Computing system 200 is, in this example, a personal computer (PC), however, in other examples computing system may take the form of a special-purpose device, an appliance, a handheld computing device, a cellular telephone device, a pager device, etc. Moreover, the arrangement in FIG. 1 can be distributed between a plurality of computers/devices.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). Of particular significance to the present invention, a touch screen based input mechanism 255 can also be included as an input device to computing system 200. Positioning information is input into computing system 200 via an appropriate touch screen interface 257. In this example, touch screen interface 257 is connected to the system bus 223, thereby allowing the positioning information to be stored in RAM 225, one of the other data storage devices, or directly to processing unit 221.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

Figure 3:
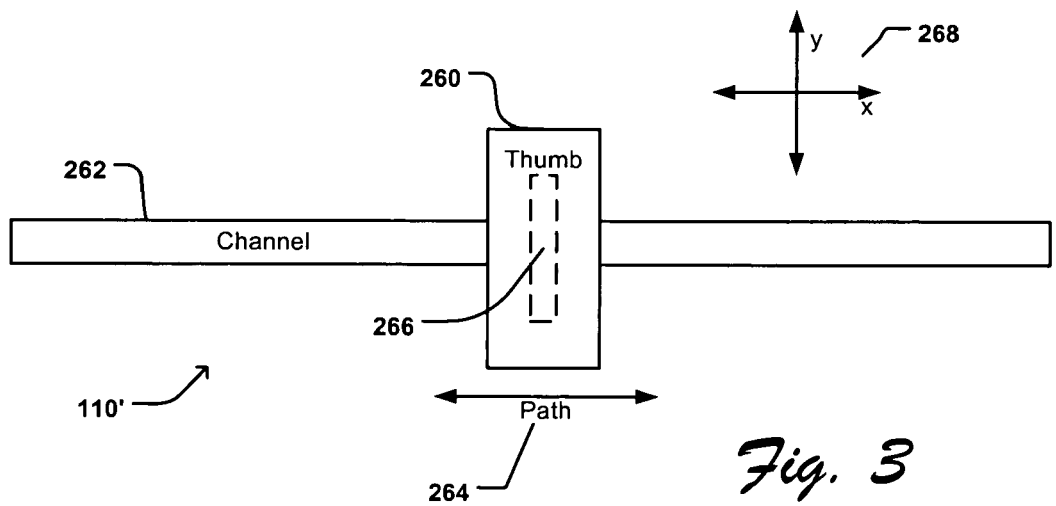
FIG. 3 is a graphical illustration of an exemplary GUI object in the form of a slider control switch having a selectably moveable thumb portion.

Reference will now be made to FIG. 3 where an exemplary GUI object 110' is shown. In this example, GUI object 110' is a slider control switch that can be used to moderate a parameter, select a function, etc. GUI object 110' includes a thumb 260 that is graphically modeled as sliding along a channel 262 in a linear direction or path 264.

In this example, GUI environment 108 is based on an x, y coordinate system as shown by directional arrows 268. Here, path 264 allows thumb 260 to slide parallel to the x-axis and perpendicular to the y-axis. Those skilled in the art will recognize that other movements, linear and nonlinear are also possible, depending upon the type of GUI object 110.

Associated with thumb 260 is a preferred contact area 266. Preferred contact area 266, which may be as small as a single point (e.g., a pixel on a touch screen display), represents a visually appealing area on thumb 260 that the GUI designers would prefer users to "grab" each time they selected thumb 260. However, as stated above, this is not always possible; sometimes the user grabs thumb 260 at a corner or an edge. Moreover, if the GUI software is programmed accordingly, the user may actually completely miss thumb 260 but still be close enough to fall within a controlling area about all or part of thumb 260.

In many implementations it would be undesirable to automatically change the position of thumb 260 so that the preferred contact area 266 matches the positioning information. Not only does this not match the physical world that is often being modeled, but it may also cause a controlled parameter, feature or function to be altered in someway that was not intended by the user.

Conversely, simply maintaining an initial offset that exists between the positioning information and thumb 260 during subsequent thumb movements may be distractive and is certainly not faithful to a modeled physical world.

To address these problems and to provide a more visually appealing GUI experience, methods and arrangements are provided below that allow for a gradual visual and operative correction between the positioning information and GUI object 110.

For example, if an offset exists between a user's input and an object's preferred contact area 266, then, as the user moves GUI object 110 within GUI environment 108 the magnitude of the offset is selectively and incrementally altered over time/distance in a manner that is nearly imperceptible to the user. This corrective process is continued, until the latest positioning information significantly matches preferred contact area 266 or falls within a defined tolerance thereof, or the user stops providing new positioning information. Consequently, the correction process tends to be more pleasing and in some instances more realistic than an immediate correction or maintenance of a continued offset.

With this in mind, reference can now be made to FIGS. 4(a-c), which depict thumb 260, as in FIG. 3, at various times while the user is moving thumb 260 towards the right hand side of the page (i.e., an increasing x direction). The corresponding positioning information 270 associated with the touch point is also depicted in FIGS. 4(a-c). For simplicity, in these examples, it is assumed that the touch point is only offset from preferred contact area 266 in the x direction.

Figure 4A:
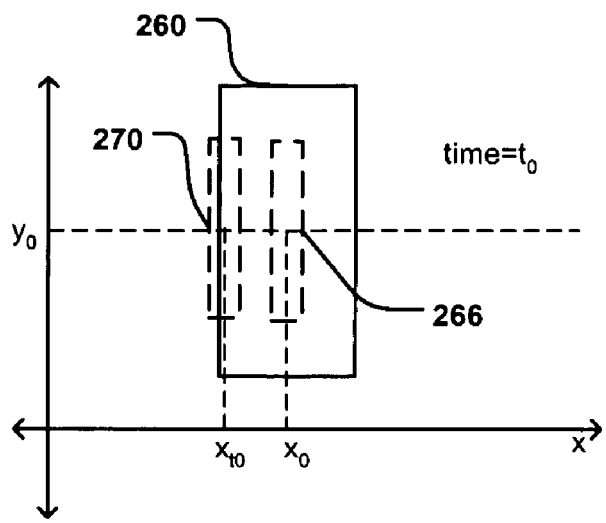
FIGS. 4(a-c) graphically depict the moveable thumb portion of FIG. 3 at different times while being moved and graphically modeled in response to continuing user inputs.

As shown in FIG. 4(a), at time $t_0$, preferred contact area 266 is situated at $(x_0, y_0)$ and positioning information 270 places the touch point at $(x_{t0}, y_0)$. The initial offset in the x direction is therefore equal to the difference between $x_0$ and $x_{t0}$. There is no offset in the y direction in this example.

Figure 4B:
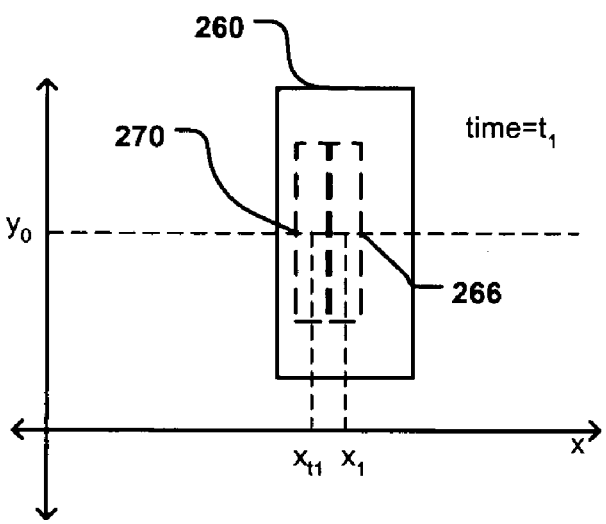

Thus, it would be preferable to correct the misplacement defined by the offset in the x direction. In FIG. 4(b), at time $t_1$, preferred contact area 266 is now situated at $(x_1, y_0)$ while positioning information 270 places the touch point at $(x_{t1}, y_0)$. The resulting offset in the x direction is therefore equal to the difference between $x_1$ and $x_{t1}$. Again, there is no offset in the y direction in this example.

The resulting offset has been reduced by slowly allowing the positioning information to essentially catch up with preferred contact area 266. This is accomplished in certain exemplary implementations using a corrective factor that effectively causes the movement of thumb 260 in the increasing x-direction to be slower than that of positioning information 270. The corrective factor is therefore associated with user's movement of thumb 260.

By way of example, in accordance with certain implementations of the present invention, the corrective factor causes the offset to be reduced by 1 pixel for every four pixels of movement in positioning data 270. Thus, for every five pixels of movement of positioning data 270 in the positive x direction, thumb 260 will be moved 4 pixels in the same direction until such time as the offset is zero, falls below a defined threshold, or the user stops inputting data. If the user were to reverse the direction of the movement while an offset still existed, then the offset would be maintained at its latest value.

Figure 4C:
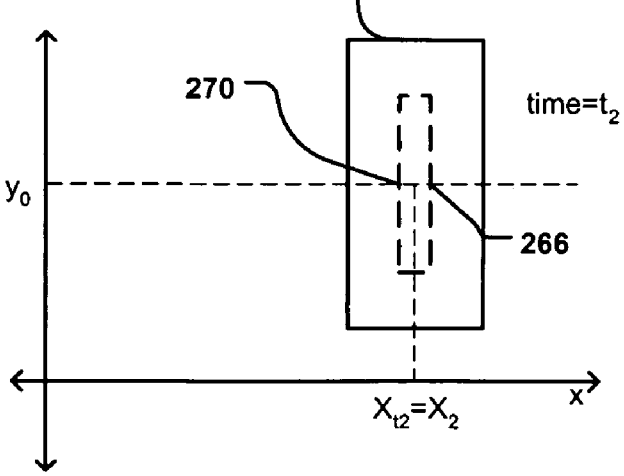

FIG. 4(c), at time $t_2$, shows that preferred contact area 266 is situated at $(x_2, y_0)$ as is positioning information 270. Thus, there is no longer an offset in the x direction since $x_2$ equals $x_{t2}$.

Though the corrective factor that is illustrated above is linear, there may be implementations that can benefit from similarly configured nonlinear corrective functions.

Figure 5:
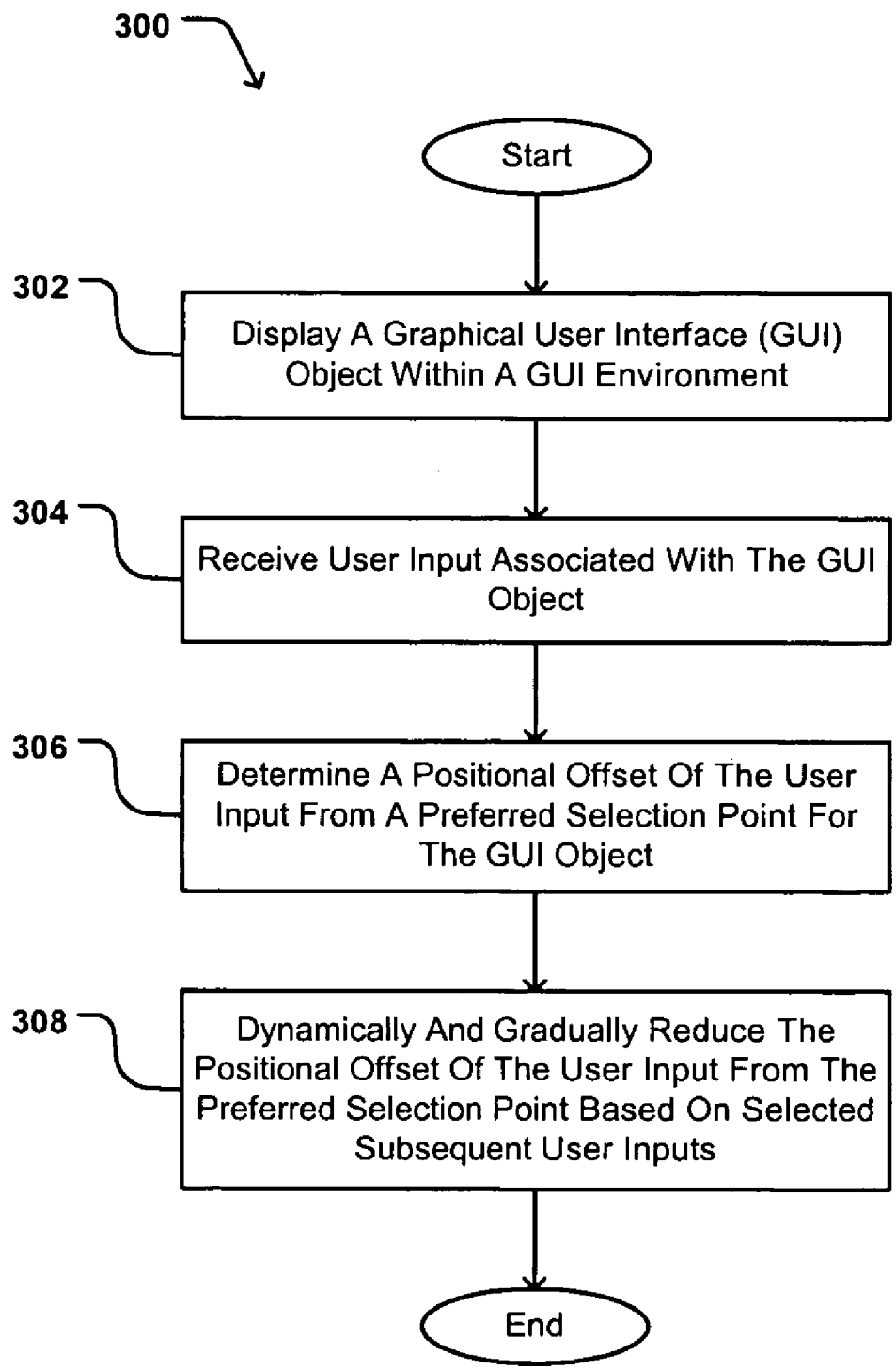
FIG. 5 is a flow chart depicting a process for selectively placing a GUI object within a GUI environment based on user inputs.

A process 300 for selectively placing a GUI object 110 within a GUI environment 108 based on user inputs is depicted in the flow-chart of FIG. 5. In step 302, at least one GUI object 110 is displayed within GUI environment 108. Next, in step 304, user inputs associated with GUI object 110 are received. In step 306, a positional offset, in one or more directions, is determined based on the user inputs and a preferred contact area associated with GUI object 110. In step 308, the positional offset is selectively and dynamically reduced over a distance based on subsequent user inputs.

It is recognized and intended that the above exemplary methods and arrangements can be applied to both the x-axis and the y-axis independently as well as simultaneously.

Although some preferred implementations of various methods and arrangements have been illustrated in the accompanying Drawings and described in the foregoing Description, it will be understood that the invention is not limited to the exemplary implementations disclosed, but is capable of numerous rearrangements, modifications and substitutions, as set forth and defined by the following claims.

What is claimed is:

1. A method comprising in a graphical user interface:
    determining an offset value between a selected object's position and an input position, wherein the input position includes updated positioning information from a user input mechanism and wherein the selected object moves in proportion to a change in the positioning information; and
    dynamically and gradually reducing the offset value in the object's position by implementing a corrective function that selectively and incrementally reduces the offset in proportion to a movement of the selected object.

2. A computer-readable medium having computer-executable instructions embodied thereon, the computer executable instructions when executed configuring a computer to perform the method of claim 1.

3. The method as recited in claim 1, wherein the corrective function includes a linear corrective factor.

4. A method comprising in a graphical user interface:
    determining an offset value between a selected object's position and an input position, wherein the input position includes updated positioning information from a user input mechanism and wherein the selected object moves in proportion to a change in the positioning information; and dynamically and gradually reducing the offset value in the object's position by implementing a corrective function including a linear corrective factor that selectively and incrementally reduces the offset in proportion to a movement of the selected object.

5. The method as recited in claim 4, wherein the object position includes a preferred contact area.

6. The method as recited in claim 5, wherein the preferred contact area includes a definable point associated with an object, and the object can be selectively moved within the graphical user interface.

7. The method as recited in claim 4, wherein the selectively and incrementally reduces reducing the offset is based on the updated positioning information.

8. The method as recited in claim 4, wherein implementing the corrective function that selectively and incrementally reduces the offset based on the updated positioning information is further selectively implemented based upon differences between the updated positioning information with respect to previous positioning information.

9. The method as recited in claim 4, further comprising graphically displaying the object within a graphical user interface.

10. A computer-readable medium having computer-executable instructions embodied thereon, the computer executable instructions when executed configuring a computer to perform the method of claim 4.

11. A computer-readable medium having computer-executable instructions for causing at least one processing unit to perform acts comprising:
   determining an offset value between a selected object's position and an input position, wherein the input position includes updated positioning information from a user input mechanism and wherein the selected object moves in proportion to a change in the positioning information; and
   in proportion to a movement of the selected object, dynamically and gradually reducing the offset value in the object's position by implementing a corrective function including a linear corrective factor that selectively and incrementally reduces the offset in proportion to a movement of the selected object.

12. The computer-readable medium as recited in claim 11, wherein the object's position includes a preferred contact area.

13. A computer-readable medium having computer-executable instructions for causing at least one processing unit to perform acts comprising:
   determining an offset value between a selected object's position and an input position, wherein the input position includes updated positioning information from a user input mechanism and wherein the selected object moves in proportion to a change in the positioning information; and
   dynamically and gradually reducing the offset value in the object's position using a corrective function that selectively and incrementally reduces the offset in proportion to a movement of the selected object.

14. The computer-readable medium as recited in claim 13, wherein an object position includes a preferred contact area.

15. The computer-readable medium as recited in claim 14, wherein the preferred contact area includes a definable point associated with an object that can be selectively moved within the graphical user interface.

16. The computer-readable medium as recited in claim 13, wherein the input position includes updated positioning information from a user input mechanism.

17. The computer-readable medium as recited in claim 16, wherein the corrective function is based at least in part on the updated positioning information.

18. The computer-readable medium as recited in claim 17, wherein the corrective function includes a linear corrective factor.

19. An apparatus comprising:
   a display device having a plurality of pixels;
   an input device configured to generate updated positioning information within an input position;
   logic configured to determine an offset value between a selected object's position and the input position, wherein the input position includes updated positioning information from a user input mechanism and wherein the selected object moves in proportion to a change in the positioning information, and to dynamically and gradually reduce the offset value in the object's position using a corrective function that selectively and incrementally reduces the offset in proportion to a movement of the selected object.

20. An apparatus comprising:
   a display device having a plurality of pixels;
   an input device configured to generate updated positioning information within an input position;
   logic operatively coupled to the display device and the input device and configured to determine an offset value between a selected object's position and the input position, wherein the input position includes updated positioning information from a user input mechanism and wherein the selected object moves in proportion to a change in the positioning information, and to dynamically and gradually reduce the offset value using a corrective function that selectively and incrementally reduces the offset in proportion to a movement of the selected object based on the updated positioning information.

21. The apparatus as recited in claim 20, wherein the object position includes a preferred contact area.

22. The apparatus as recited in claim 21, wherein the preferred contact area includes a definable point associated with an object that can be selectively moved within the graphical user interface.

23. The apparatus as recited in claim 20, wherein the corrective function includes a linear corrective factor.

24. The apparatus as recited in claim 20, wherein the input device includes a pointing device.

25. The apparatus as recited in claim 24, wherein the pointing device includes a mouse.

26. The apparatus as recited in claim 20, wherein the input device includes a touch screen device.

27. The apparatus as recited in claim 20, wherein the logic is operatively configured within a computer.

* * * * *